J. M. McPIKE.
Harrow Attachment for Plows.
No. 201,694.        Patented March 26, 1878.
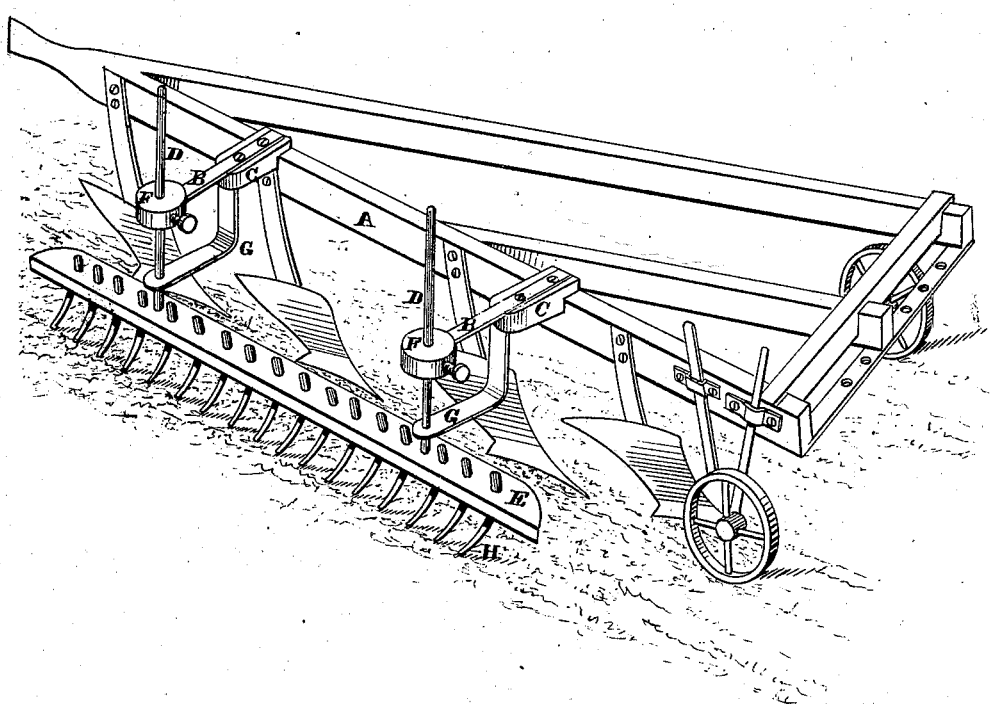
Witnesses
Jno. L. Boone
Geo. H. Strong
Inventor
John M. McPike
by Dewey & Co
Attys

UNITED STATES PATENT OFFICE.

JOHN M. McPIKE, OF ST. HELENA, CALIFORNIA.

IMPROVEMENT IN HARROW ATTACHMENTS FOR PLOWS.

Specification forming part of Letters Patent No. 201,694, dated March 26, 1878; application filed February 16, 1878.

*To all whom it may concern:*

Be it known that I, JOHN M. MCPIKE, of St. Helena, county of Napa, and State of California, have invented a Single-Beam Harrow; and I do hereby declare the following to be a full, clear, and exact description thereof, reference being had to the accompanying drawings.

My invention relates to a novel attachment for plows, and which I call a "single-beam harrow."

It is more especially applicable to that class known as "gang-plows," to one of which I have shown it attached; and it consists in a single beam provided with inclined teeth, so constructed as to clear themselves; and in a method of attaching and adjusting the harrow, as will be more fully described in the following specification, reference being had to the accompanying drawings, in which the figure is a view of my harrow as attached.

In the ordinary method of plowing and harrowing, especially in adobe and similar soils, the harrowing is frequently left until after plowing has been finished some time, when the soil becomes hardened, many clods becoming baked by exposure to such a degree as to become stony, and much difficulty is experienced in harrowing and breaking such clods.

In my invention the harrow is practically a part of the plow, and the operations of plowing and harrowing are simultaneous.

A is the ordinary gang-plow frame, having springs B B supported upon short pieces C C, attached to the beam of the frame which carries the plows, and these springs carry vertical standards D D, that pass through their ends to the single-beam harrow E below.

The said springs may be made of several leaves, so as to give them suitable strength and elasticity; and when any obstruction, such as a bowlder, is passed over, the harrow will rise without being broken.

The springs are provided with collars and set-screws F F, through which the standards D D pass, for the purpose of holding and adjusting the harrow. From the beams C arms G extend downward, so that their ends stand just above the harrow D to pass through, so that the arms B and G serve as guides, and to give the harrow an elastic pressure, which causes it to relieve itself and follow the irregularities of the surface, so that there will be no unharrowed portion. The harrow stands parallel with the plow-beam, and this moves diagonally along the ground to be harrowed. It is set at such a distance from the plows that its rear end will leave the last furrow untouched in its passage, so that it will be free for the unimpeded progress of the furrow-wheel when the plow next passes. Its front end, however, extends far enough out to reach this uncultivated portion at its next passing, thus harrowing the whole ground, and it may also be made capable of lateral adjustment when desired.

The under front side and ends of the harrow-beam are rounded off, so that when in operation it will pass easily over clods of the furrow, and assist the teeth H to break them up, not carrying the dirt and rubbish along with it. These teeth H are inclined backward, and of suitable construction to free themselves readily from grasses and other obstructions; and it will be manifest that my harrow can be applied to any plow or seeding apparatus by slight changes in the attachments.

From the foregoing explanation it will be seen that harrowing and plowing with my implement will accomplish at one operation a saving of both time and labor, while by its diagonal motion it is very thorough and effective.

Having thus described my invention, I claim as new and desire to secure by Letters Patent—

1. The harrow consisting of the single-tooth bearing-beam E, supported from the plow-beam by means of the spring-arms B G and the vertical standards D, substantially as herein described.

2. The single-beam harrow E, with its vertical standards D, guided and supported by the spring-arms B G, and provided with the adjusting-collars and screws F, substantially as herein described.

In witness whereof I have hereunto set my hand and seal.

JOHN M. McPIKE. [L. S.]

Witnesses:
GEO. H. STRONG,
FRANK A. BROOKS.